US005757546A

United States Patent [19]
Lipton et al.

[11] Patent Number: 5,757,546
[45] Date of Patent: May 26, 1998

[54] ELECTRONIC STEREOSCOPIC VIEWER

[75] Inventors: Lenny Lipton, San Rafeal; Jeffrey James Halnon, Richmond; Bruce Dorworth, Vacaville, all of Calif.

[73] Assignee: Stereographics Corporation, San Rafael, Calif.

[21] Appl. No.: 161,245

[22] Filed: Dec. 3, 1993

[51] Int. Cl.$^6$ .............................. G02B 27/22; H04N 9/47; H04N 13/04

[52] U.S. Cl. .................. 359/464; 359/466; 359/462; 348/521; 348/56

[58] Field of Search ..................... 359/462, 466, 359/477, 464, 472, 465, 376, 630, 463; 348/51, 53–56, 57

[56] References Cited

U.S. PATENT DOCUMENTS

| | | | |
|---|---|---|---|
| 3,298,771 | 1/1967 | Ratliff, Jr. | 350/197 |
| 3,463,570 | 8/1969 | Ratliff | 359/467 |
| 3,670,097 | 6/1972 | Jones | 359/472 |
| 4,281,341 | 7/1981 | Byatt | 348/57 |
| 4,406,532 | 9/1983 | Howlett | 354/114 |
| 4,877,307 | 10/1989 | Kalmanash | 359/465 |
| 4,897,715 | 1/1990 | Beamon, III | 358/93 |
| 4,902,116 | 2/1990 | Ellis | 350/501 |
| 4,933,755 | 6/1990 | Dahl et al. | 358/88 |
| 4,968,123 | 11/1990 | Fournier, Jr. et al. | 350/538 |
| 4,982,278 | 1/1991 | Dahl et al. | 358/88 |
| 5,123,726 | 6/1992 | Webster | 351/201 |
| 5,129,726 | 7/1992 | Holakovszky et al. | 351/50 |
| 5,245,319 | 9/1993 | Kilian | 345/9 |

OTHER PUBLICATIONS

"Binocular Symmetries As Criteria For The Successful Transmission Of Images In The StereoDimensional (TM) Brand Stereoscopic Video System" by Lenny Lipton; SPIE vol. 507; Processing and Display of Three–Dimensional Data II (1984); pp. 108–113.

*Primary Examiner*—Paul M. Dzierzynski
*Assistant Examiner*—Audrey Chang
*Attorney, Agent, or Firm*—Limbach & Limbach L.L.P.

[57] ABSTRACT

An electronic stereoscope displays field-sequential stereoscopic images on a display screen at a predetermined field rate. The images are viewed through left and right electro-optical shutters driven out of phase with each other and synchronously with the field rate. Left and right lenses are also provided in correspondence with the left and right shutters to accommodate and converge the user's eyes on the display screen.

10 Claims, 2 Drawing Sheets

ELECTRONIC STEREOSCOPIC VIEWER

BACKGROUND

For several years, inventors, the public, and the press have shown great interest in an emerging art which has been called virtual reality (VR). Virtual reality, to restrict ourselves its visual component, is a technology which seeks to substitute electronic display for the visual world in such a manner that, in its ideal form, the display would be isomorphic with the visual world. That is, such a display, in its most perfected state, would be impossible to tell from the visual world of daily experience. Such an achievement is beyond the state of the art, but that doesn't stop people from trying.

There are many virtual reality products offered in the marketplace, and many such devices have been described in the patent literature, the popular literature, and journal articles. There are a number of newsletters and journals devoted to the subject. The background literature is voluminous, including the following U.S. Pat. Nos: 4,897,715; 4,902,116; 4,933,755; 4,968,123; 4,982,278; 5,123,726; and 5,129,716. These patents deal with head mounted or helmet mounted displays (HMD's).

One of the most keenly touted facets of virtual reality is immersion viewing, in which the user sees a wide view image of the world which encompasses, more-or-less, complete peripheral vision. In order to accurately replicate the way we see the world, such an image should have motion, be reasonably sharp, be in full color, and be stereoscopic. A typical HMD device for viewing such images is a helmet or large visor, and a number of such HMD devices are known.

In a typical HMD device, each eye receives visual information along a separate optical path, each image being part of a stereo pair. The images are often computer generated but they may be produced by stereoscopic cameras. A major shortcoming of known HMD's is the price, which may be tens of thousands of dollars. Another serious shortcoming is the lack of adequate resolution. One respected observer of the field has quipped that a user becomes legally blind when using a VR helmet. The weight and cumbersome nature of the viewing device are also serious drawbacks.

A VR helmet may use a pair of liquid crystal (LC) display screens with accommodating lenses to help the eye focus on the small screen at the close distance. This is a straightforward application of the Brewster or lenticular stereoscope. See FIG. 1. Unfortunately, the resolution of currently available LC display screens is not adequate for the immersion viewing application. Typically, known LC display screens have NTSC resolution of approximately 500×400 pixels, or less. When one puts on such a helmet and observes the virtual world, it looks like a crude and magnified pointillist painting.

Recently both Kaiser Electro-optics and the display group of Tektronix have shown small monochrome video display cathode ray tubes (CRT) with fairly high resolution which produce field sequential color by means of a liquid crystal modulator using color polarizers. These devices are bulky when used in an HMD and require a computer or a camera to produce a non-standard format for the production of color using a time multiplex approach. The display must work at an extraordinary 180 fields per second. Although such a rate eliminates the dot matrix artifact, color fringing may be seen when there is rapid motion. Since two devices must be used, the cost is doubled and both images must be carefully calibrated to conform to each other in terms of geometric congruence. See, e.g., Lipton, "Binocular Symmetrics As Criteria For The Successful Transmission Of Images In The StereoDimensional Brand Stereoscopic Video System", SPIE Proceedings Vol. 507, 1984.

Such HMD's have a motion-sensing device which follows the head movement of the observer. The head movement is tracked to allow the computer to generate continuously changing perspective. Depending upon the power of the computer and the nature of the program, a reasonable animated tour of a universe, or a "walk-through" as it is termed in the art, may be provided. There may also be a degree of interactivity provided by an input device such as a mouse, a joystick, or a glove. Such input devices are linked to the computer to allow the user to manipulate objects in the virtual space.

As mentioned, a number of such display devices have been shown, but they suffer from high cost of manufacture or shortcomings in the quality of the display. I therefore have turned my attention to a new type of device which provides immersion capability, while improving the resolution to provide a pleasing image. This is accomplished at a relatively low price. Moreover, simple means may be employed to give the user an opportunity to interact with the virtual environment.

In one embodiment the user looks into a device which resembles Edison's Nickelodeon. In another embodiment the user wears an HMD. Yet another application for the technology is for a viewfinder for a stereoscopic video camera, and that will also be disclosed here.

SUMMARY OF THE INVENTION

An electronic stereoscope is disclosed. In the preferred embodiment, a video display apparatus generates field-sequential stereoscopic images on a display screen at a predetermined field rate. A housing is attached the video display apparatus and extends in the field of view of the display screen. Left and right lenses are mounted in the housing to accomodate and converge the user's eyes on the display screen. Left and right electro-optical shutters are mounted in the housing in correspondence with the left and right lenses, and the shutters are driven out of phase with each other and synchronously with the field rate.

In another embodiment, a mirror is provided adjacent to a video display screen for reflecting the field-sequential stereoscopic images which are displayed on the display screen along a first optical path. A lens system is affixed along the first optical path for splitting the displayed images along two paths, namely a left optical path and a right optical path. Left and right lenses and left and right shutters are affixed adjacent to the lens system and in respective optical paths. The shutters are driven out of phase with each other and synchronously with the field rate.

DESCRIPTION OF THE INVENTION

Figure 1:
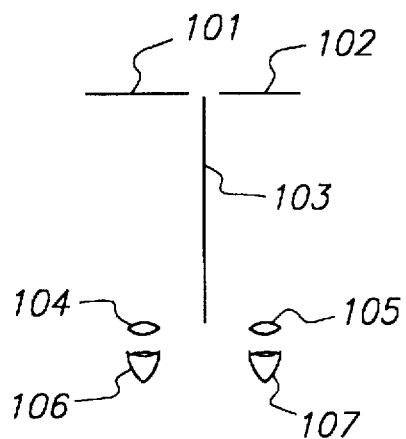
FIG. 1 is a schematic viewing showing the layout of a conventional lenticular stereoscope.

FIG. 1 shows the layout of parts for a conventional lenticular stereoscope which provides the basis for many HMD's and other types of VR immersion viewing devices. A left image 101 and a right image 102 which may be provided by any display means, such as the surface of a CRT or LC device. A means for optically separating the two images 101, 102 so that each may be seen by only its appropriate eye is provided by septum 103. An observer having left eye 106 and right eye 107 views the images 101, 102 through left lens 104 and right lens 105, respectively. Each lens 104, 105 has a positive diopter power to help the eyes to focus or accommodate on the small displays, which are quite close to the eye. This arrangement of parts is well know in the art having been introduced by Brewster about a century and a half ago, and has been the basis for most successful stereoscope designs.

Although lenses 104, 105 are shown as simple double convex lenses, more complex designs with many elements for optical correction may be employed. Efforts have been made by some inventors, for example, Ratliff, U.S. Pat. No. 3,298,771 and Howlett U.S. Pat. No. 4,406,532, to provide well corrected optics which cover a wide field of view to provide the full immersion effect.

The original Brewster stereoscope used an optical system employing diverging prisms to allow for the viewing of images which were larger than the interocular separation. The use of oversize stereopairs, or cards with images whose widths are larger than the interocular, has been a tradition in stereoscopy for many years It allows for prints which may have a little more image quality than images whose widths are confined to the interocular separation. This is pointed out because the present invention employs converging, rather than diverging prisms in its optical system.

When LC displays are used for a wide field of view, such as that needed for the immersion effect, the result is a visually poor image because of the low resolution of the display, typically at NTSC or VGA levels. It has been noted by many persons that such displays are unpleasant to use became of their lack of visual acuity.

The color shutter CRT displays, while small for video picture tubes, are rather large and heavy for an HMD application. They do have better quality than the LC displays, but as noted above, there must be a high degree of geometric correlation between the left and right display devices. While this is intrinsically provided by LC displays, picture tubes need careful adjustment and may require frequent adjustment. If the images vary in size or shape, the result may be discomfort for the user. Therefore, a means was sought to overcome the shortcoming of the prior art and to provide the user with a stereoscope which would have improved performance at a lower cost of manufacture.

Figure 2:
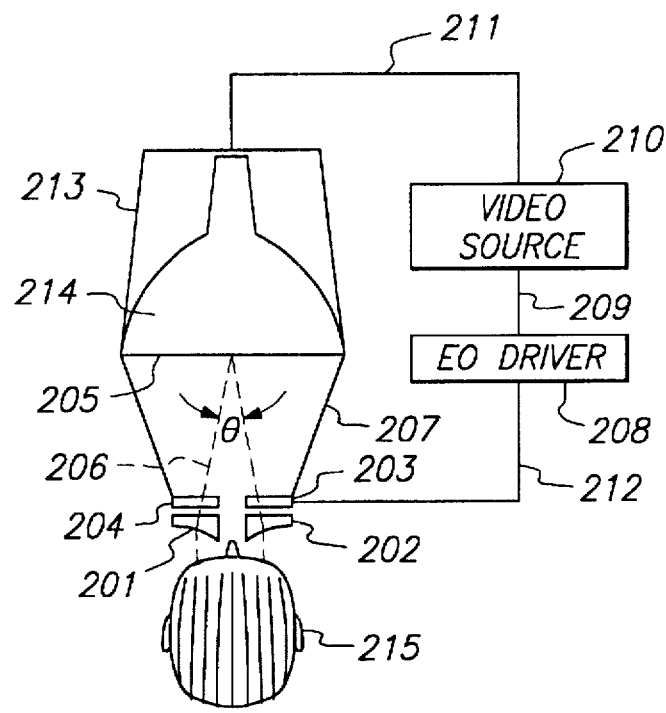
FIG. 2 is a schematic illustration of the first embodiment of the electronic stereoscope according to the present invention.

FIG. 2 is a drawing of a preferred embodiment of the invention. The invention is a stereoscope, but it is different from the traditional Brewster device in that the left and right images are, in effect, superimposed on the same display surface 205 of monitor 213 using CRT 214. The lenses 201, 202, of the system are housed in housing 207 and are devoted to accommodating and converging the eyes of the user to the same display screen 205. Electro-optical shutters 203, 204 are employed and driven synchronously with the video field rate, as described below. The field sequential approach is used to generate images. A flickerless image for an electron display is known from Lipton, U. S. Pat. No. 4,523,226, the text of which is expressly incorporated herein. The present invention is the first such application of the field sequential technique to a stereoscope design of the type taught here.

The invention uses a single CRT display monitor 213 which operates at a high enough vertical frequency to avoid flicker in a field-sequential system. Typically, this is 120 fields per second in North America. In this kind of field sequential stereoscopic device, sufficient fields are presented to each eye so that no flicker is seen. When one eye sees an image, the other eye is occluded by means of an electro-optical shutter. The time-multiplexing technique usually employs LC shutters, synchronized to the video or computer image field rate so that the LC shutters open and close out of phase with respect to each other, and in phase with the fields as they are written, so that each eye sees only its required image.

The optical lenses 201, 202 are mounted several inches from the monitor screen 205, depending upon the angular coverage required and the size of the screen. As already mentioned, the lenses 201, 202 provide both accommodation and convergence for the user's eyes, hence they are called A/C lenses. Although the drawing shows the A/C lenses 201,202 located near the user's eyes, they may also be placed between the electro-optical shutters 203, 204 and the display screen 205. Manufacturing considerations will determine the best location.

As is common with stereoscope designs, the lens axes of the positive diopter component of the lenses 201, 202 will be parallel to each other and perpendicular to the surface of the display screen 205. It is also contemplated that the axial line of the display screen surface, i.e., a line formed by a perpendicular dropped to the center of the surface of the screen and roughly bisecting the angle θ, will pass between the left and right lenses, the lenses being located with their optical centers more or less equidistant on either side of the axial line. The two lens axes are located along a horizontal line which is parallel to the horizontal edge of the monitor's screen.

Since it may be required that the image encompass a large field of view approaching or exceeding 100 degrees in the horizontal direction, each eye (since it is relatively close to the display screen) must be provided with an accommodating optical system that allows the eye to focus on the optical path distance 206. This is accomplished by a positive diopter component incorporated into the optical system.

Moreover, the eyes must be able to converge inward by angle θ, the convergence angle. Therefore, each eye looks through a combination of prismatic and positive-diopter lenses. Accommodation is provided for the close distance by means of the positive diopter component, and the prismatic component of the lens allows the eyes to converge on the screen. Lenses of this type are well known to optometrists and are used for the correction of vision defects on a routine basis. Because they are routinely employed, they are relatively inexpensive, and years of continual manufacture has resulted in a product of good optical quality.

The lenses 201, 202 are of single element construction, incorporating both accommodation and convergence correction. This results in a product with a lower cost of manufacture than one made with two (or more) separate optical elements, one for focusing and one for convergence. It should be understood by those familiar with the art that this disclosure does not lose generality by showing one element construction and that in some instances there may be advantages to using two or more elements.

In one example of the invention, a 14-inch-diagonal CRT monitor was employed with a screen 11 inches across. The observer's eyes were placed approximately six to seven inches from the screen, which provided approximately a 90-degree angle of view. The required A/C optical power was determined using an optician's kit consisting of refractive and prismatic lenses. A number of observers looked at the display screen and expressed their opinions with regard to sharpness and ease of viewing. Different combinations of focusing and prismatic lenses were tried until a pleasing combination was found. In this example, an optical formula of 4.5 diopters spherical and 8 prism diopters base was chosen.

Other formulas may be empirically determined for different monitor sizes and observer distances from the display screen. The size of the monitor and the distance from it determine the angular coverage or the degree of immersion. For some applications, little or no immersion effect is desirable, and the field of view may be restricted to 40 degrees or less. On the other hand, it is possible using lenses of the type described here to practically fill the observer's visual field.

In the example described above, the electro-optical shutters 203, 204 were those employed in a production pair of CrystalEyes® eyewear, a product of StereoGraphics Corp. The large lenses of the eyewear allow for users with large or small interocular values to use the viewer without any optical adjustment. Moreover, by choosing the right optical formula through testing users of various ages, experiments with a small population have shown that it may be possible to find a single formula that provides good results for just about everyone.

Because the ability to accommodate the eye decreases with age, it may be necessary to have the user focus the lenses 201, 202, and this may be accomplished by using means well known in the art. For example, the distance between the lenses and the screen may be changed by simple mechanical means.

The CrystalEyes ® shutters, mentioned above, gave the best performance when the shutters were coplanar with each other and parallel to the plane of the display screen. This configuration produced the least cross-talk between left and right images.

The following approach has also worked successfully. Rather than add prism to the leans formula, the spherical lens blank was decentered with respect to the optical axes of the eyes. By choosing the distance between lens centers to be between 45 mm and 50 mm, adequate convergence was provided for nearly all observers.

In one experiment, the lens and shutter combination was placed about 12 inches from a 15-inch display screen. This reduced the size of the image and improved image quality especially for images playing back from video tape. A 2 diopter lens with a 50 mm center was used as described above. The results were good for most observers.

The monitors of the type employed in this invention may have very high resolution, typically 1200 by 1000 pixels. The monitor may be fed a signal which has been formatted in a field-sequential manner, such as that disclosed in U.S. Pat. No. 4,523,226, or that disclosed in U.S. Pat. No. 5,193,000, or by some other field-sequential format. When the observer looks though the A/C lenses 201, 202 and through the powered and synchronized electro-optical shutters 203, 204, the result is an image which is bright, sharp, and encompasses a wide angle of view. Unlike existing virtual reality devices, a sharp stereoscopic image is seen and the user is not required to wear a heavy helmet.

Unlike the Brewster stereoscope, which uses two separate images and is the basis for the immersion viewers found in a typical HMD, the present device superimposes the two images. By superimposing the two images in sequence, the field-sequential technique can be used with standard high resolution monitors. Thus, the present technique avoids the pitfalls of prior art which must use special display screens which are costly or of low performance. The present technique also allows for the desired virtual or wide field of view effect, and takes advantage of the infrastructure of the CrystalEyes® product which has developed over the past several years.

Interactivity may be provided with any one of several well known means for tracking the rotation or movement of an object as applied to the tracking of the movement of the monitor or with other hand actuated input devices. In particular, mouse technology has been employed and coupled to the monitor so that when it is rotated its location will react interactively with the computer generated image. In this way the user may "walk" through a computer generated environment.

Figure 3A:
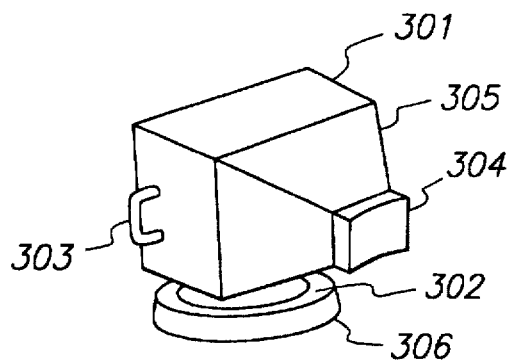
FIGS. 3A and 3B illustrate user input means for providing interactivity for the embodiment shown in FIG. 2.
Figure 3B:
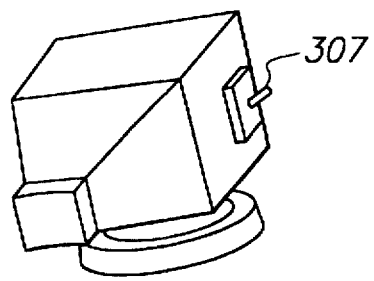

FIGS. 3A and 3B show one embodiment of a monitor 301 having shutter eyepieces 304 mounted on housing 305. The user holds onto the monitor by means of handle 303 and rotates the monitor via swivel head 302 on pedestal 306. A sensor (not shown) of the type used in mouse products is located in the base of the monitor and tracks position or orientation. Swiveling may take place vertically or horizontally or by a combination of both.

A joy stick 307 or similar input device may be used to control other interactive parameters, such as the speed of movement through the virtual environment.

The essence of the art disclosed here involves the use of optics to converge and accommodate the eyes to help them view a single display surface written with a field sequential stereoscopic image. Each eye views the display surface through its own optical path, wherein the optical path incorporates electro-optical shutters to segregate the appropriate set of image fields for the appropriate eye. The described embodiment uses full sized CRT displays, but it is also advantageous to use miniature display tubes for some applications, such as a viewfinder for a stereoscopic video camera or for an HMD, and this will be described below.

Figure 4A:
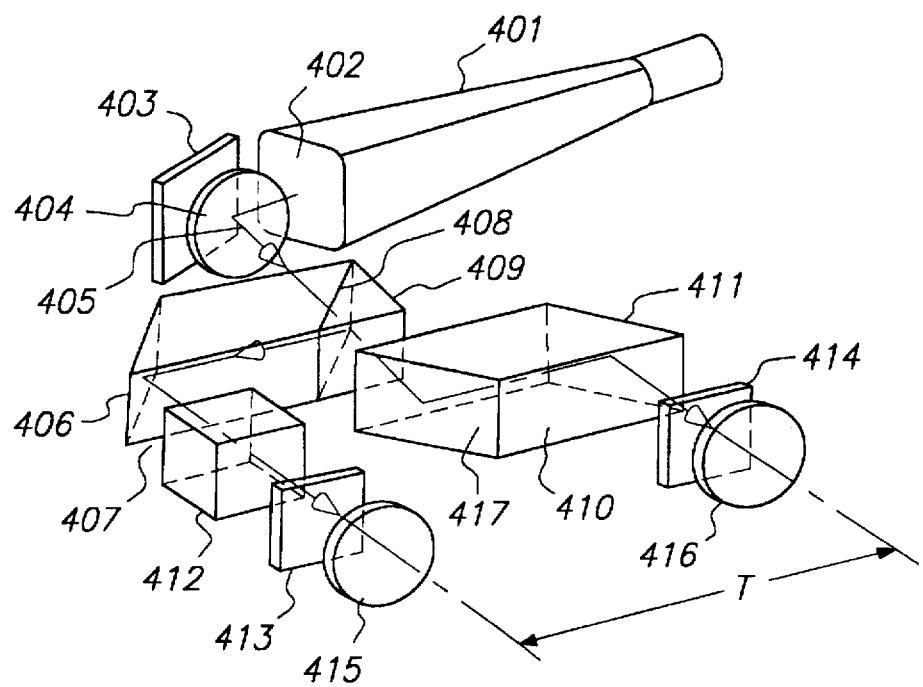
FIGS. 4A, 4B, 4C illustrate another embodiment of the present invention.
Figure 4B:
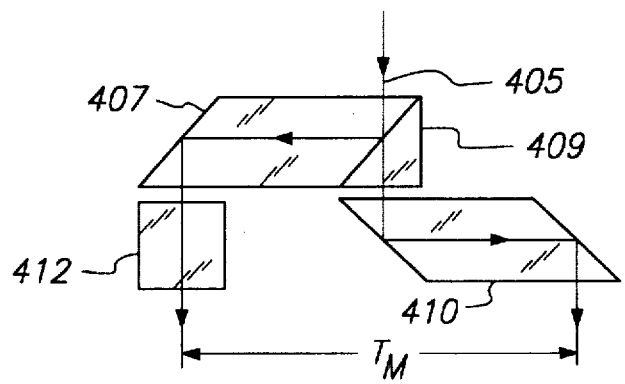
Figure 4C:
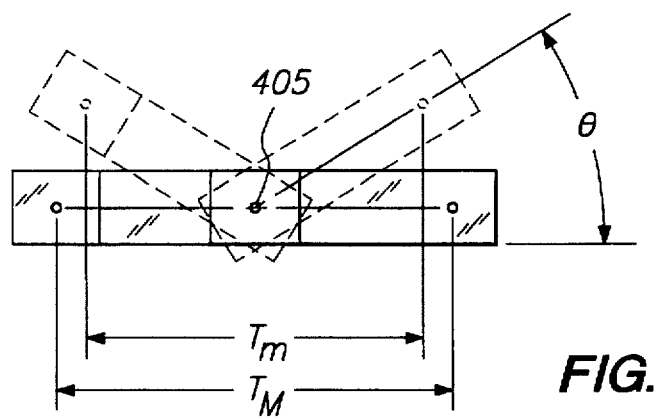

The design shown in FIGS. 4A, 4B, 4C, is based on the well know Carl Zeiss Binocular-Ocular Prism System. Other optical systems are known which may achieve the same end, and by specifying the invention using this particular embodiment I do not limit myself to it alone. For example, in place of the prisms shown here, mirrors and semi-silvered mirrors may be substituted to save weight.

FIG. 4A shows miniature CRT 401 having a display surface 402 on the order of one inch in diagonal The image displayed on surface 402 is reflected by mirror 403 through a right angle. This arrangement is advantageous for a camera viewfinder application. Such viewfinders are typically mounted on either side of the camera for comfortable viewing, hence the location of the CRT 401 in this particular design. Light rays are reflected by mirror 403 to objective lens 404, and then through the prism system shown. Rotational axis 405 will be mentioned in connection with the system's ability to adjust for interpupillary distance T.

The Carl Zeiss system is used for microscopes and other optical devices where both eyes are required to view the image presented by the objective. The system is made up of four single prisms. The right angle prism 409 is cemented to the rhomboid prism 407. The cemented surface 408 will split the beam of light so that half will reach the right eye and half will reach the left eye.

The light passing through prisms 407 and 409 will pass through prism 410, then be reflected by surfaces 417 and 411. The other ray, separated at surface 408, will be reflected by surface 406 and pass through the block 412 which equalizes the length of the light path so the left eye and right eye images will be of the same size.

Electro-optical shutters 413 and 414 are shown in the optical paths to the left and right eyes respectively. Left and right eyepieces 415 and 416 are also shown. Shutters 413 and 414 may be located at other convenient places in the optical path as will be obvious to anyone conversant with the art.

FIG. 4B is a top view of the prism system and helps to show the optical path described here. The prisms are labeled rather than the reflecting surfaces. $T_M$ is the maximum distance for the left and right optical paths for each eye. FIG. 4C is a frontal view of the optical system, and when taken together with FIG. 4B illustrates the means for varying the distance between the left and right images between maximum distance $T_M$ and the minimum distance $T_m$.

The distance is varied by rotating the prisms about the axis of rotation 405 as shown in FIG. 4C. Angle $\theta_M$ is given by following: $\cos \theta_{M=Tm} T_M$. Since the interpupillary varies between $T_m$ =2.28 and $T_M$ =2.83, $\cos \theta_M$=0.8053, or $\theta_M$=36°22'.

Each eye sees the image 402 at the surface 402 of the CRT 401. However, each will only see its appropriate alternate image because each eye sees through respective electro-optical shutters 413 and 414 in the optical path. The shutters are occluding out of phase and in synchrony with the fields written on display screen 402. Other optical systems may give a similar result, for example, see U.S. Pat. No. 4,805,988 to Danes.

The CRT 401 may be mounted so that the planar surface of its screen 402 is perpendicular to the axis of rotation 405 or at some other orientation convenient for the application. For example, in a camera viewfinder application, it may be convenient to have the CRT be horizontal such that the surface of the screen is parallel to the axis of rotation 405. The CRT may be placed vertically looking downward, which may be most convenient for an HMD application. Persons familiar with the art will understand that by the use of reflecting surfaces many convenient orientations for the display tube CRT 201 may be selected depending upon the application.

In the case of the viewfinder application, in addition to viewing stereoscopically, it will prove convenient to be able to turn off the shutters so that both are open in order to allow both eyes to view the display simultaneously In this way, the videographer may view the parallax which may be helpful in determining which object will appear at the plane of the display screen. If the shutters 413 and 414 are switched in synchrony with each other, rather than out of phase, it will be possible to display either the left image to both eyes or the right image to both eyes. This is important for the videographer since individual focus and image quality also need to be observed on occasion.

I claim:

1. An electronic stereoscope, comprising:
    means for displaying left and right video fields on a single display surface in a field sequential manner at a predetermined video field rate;
    a housing attached to the displaying means and extending in a field of view of the display surface;
    left and right lenses mounted in the housing to permit viewing of the display surface, each lens including means for correcting for accommodation and convergence;
    left and right electro-optical shutters mounted in the housing in correspondence with the left and right lenses; and
    means for synchronously driving the left and right shutters in phase with respective video fields.

2. An electronic stereoscope as in claim 1, wherein said correcting means comprises at least one lens having a positive diopter component.

3. An electronic stereoscope as in claim 1, wherein said correcting means comprises at least one lens having a prismatic component.

4. An electronic stereoscope as in claim 1, wherein the electro-optical shutters are each comprised of liquid crystal material held in a frame and electronically connected to the driving means.

5. An electronic stereoscope as in claim 1, wherein the displaying means has a scanning rate that is adequate to avoid flicker when viewing the field-sequential, stereoscopic display.

6. An electronic stereoscope, comprising:
    a video display apparatus having a display surface, wherein left and right video fields may be provided to the video apparatus for field-sequential, stereoscopic display on the display surface at a predetermined video field rate;
    a mirror adjacent the display surface for projecting the displayed video fields along a first optical path;
    a lens system comprising four single prisms and affixed in the first optical path for splitting the displayed video fields into a left optical path and a right optical path;
    left and right lenses affixed adjacent to the lens system to permit viewing video fields in the left and right optical paths, respectively;
    left and right electro-optical shutters affixed adjacent to the lens system in correspondence with the left and right lenses; and
    first means for synchronously driving the left and right shutters in phase with respective video fields.

7. An electronic stereoscope as in claim 6, wherein the lens system is rotatably affixed in the first optical path to facilitate adjustment for interpupillary separation.

8. An electronic stereoscope, comprising:
    means for projecting stereoscopic images along a first optical path, wherein the stereoscopic images comprise left and right video fields projected in a field sequential manner at a predetermined video field rate,
    means for splitting the stereoscopic images along a left optical path and a right optical path,
    left and right electro-optical shuttering means affixed in the left and right optical paths, respectively,
    means for synchronously driving the left and right shuttering means in phase with the left and right video fields, respectively, and
    left and right lens means affixed in the left and right optical paths, respectively, wherein each lens means comprises means for correcting for accommodation and convergence.

9. An electronic stereoscope, comprising:
    means for displaying left and right video fields on a single display surface in a field sequential manner at a predetermined video field rate,
    left and right electro-optical shutters affixed in a field of view of the displaying means,
    means for synchronously driving the left and right shuttering means in phase with the left and right video fields, respectively, and
    left and right lens means affixed in correspondence with the left and right shutters, respectively, for correcting for accommodation and convergence.

10. An electronic stereoscope as in claim 9, wherein each lens means includes a positive diopter component and a converging prismatic component.

* * * * *